No. 807,775. PATENTED DEC. 19, 1905.
G. REISDORF.
VEHICLE BRAKE.
APPLICATION FILED JUNE 14, 1905.
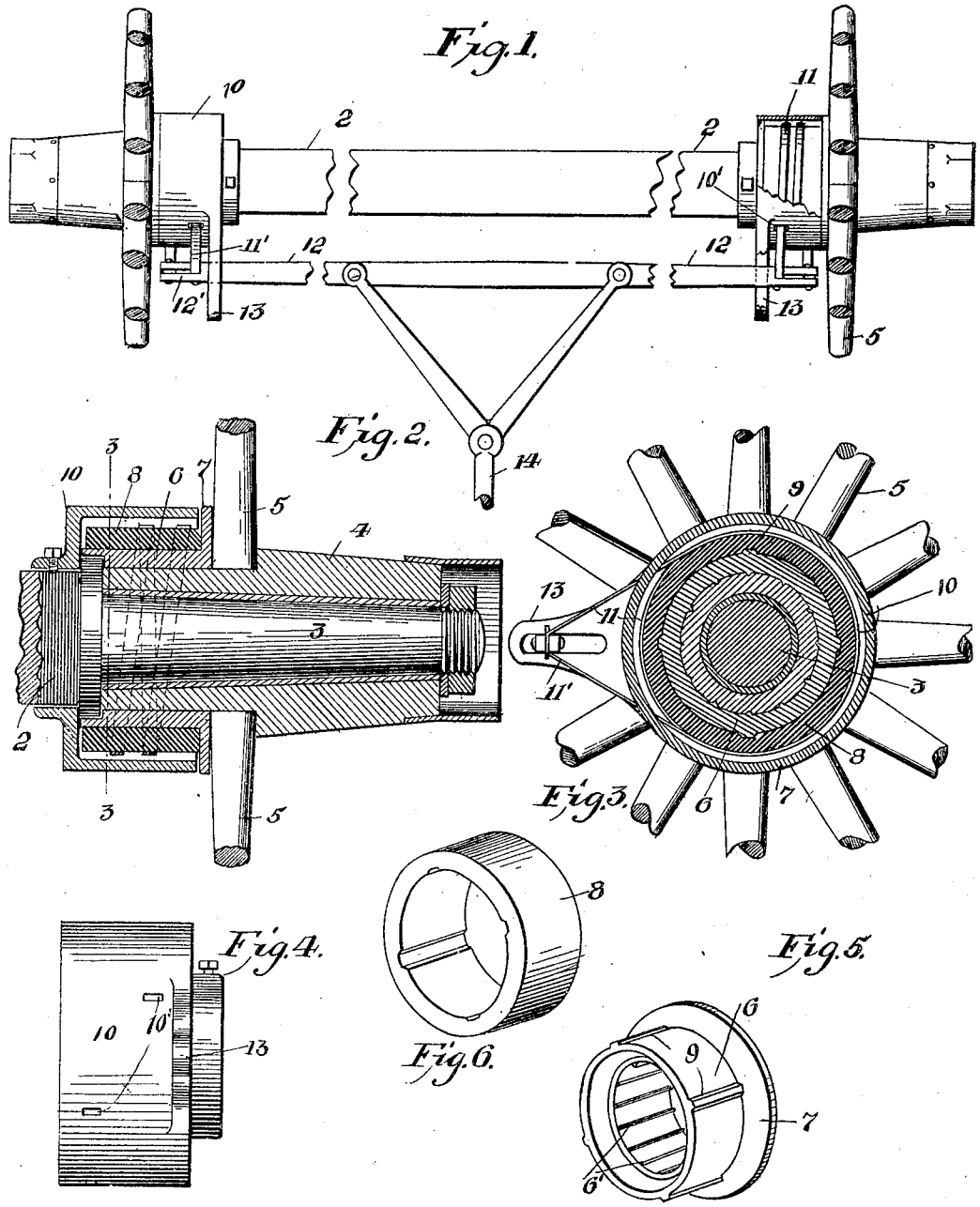
WITNESSES
INVENTOR

UNITED STATES PATENT OFFICE.

GEORGE REISDORF, OF CORAOPOLIS, PENNSYLVANIA.

VEHICLE-BRAKE.

No. 807,775.   Specification of Letters Patent.   Patented Dec. 19, 1905.

Application filed June 14, 1905. Serial No. 265,126.

*To all whom it may concern:*

Be it known that I, GEORGE REISDORF, a citizen of the United States, residing at Coraopolis, in the county of Allegheny and State of Pennsylvania, have invented certain new and useful Improvements in Vehicle-Brakes, of which the following is a specification, reference being had therein to the accompanying drawings.

This invention relates to that class of vehicle-brakes wherein the braking power is applied through or by means of a friction-band operating on an annular portion of the wheel, usually the hub thereof; and one object is to improve the construction of that portion of the hub with which the brake-band coöperates.

Further objects are to provide an improved casing for inclosing the brake-band and band-engaging surface of the hub, which casing also serves the purpose of the ordinary dust-guard; also, to provide improved means for supporting the brake-band-actuating device.

In the accompanying drawings, Figure 1 is a top plan view of portions of an axle and wheels of a vehicle having my improved mechanism applied thereto, parts thereof being broken away or shown in section. Fig. 2 is a longitudinal sectional view of one of the wheel-hubs and brake mechanism. Fig. 3 is a cross-sectional view taken on line 3 3 of Fig. 2. Fig. 4 is a front view of one of the brake-inclosing casings. Figs. 5 and 6 are detail views of portions of the hub structure.

Referring to the drawings, 2 designates a vehicle-axle upon spindle 3 of which is mounted wheel-hub 4 in usual manner.

5 designates the spokes.

A metallic sleeve 6 is shrunk on the inner portion of the hub, the interior of the sleeve being preferably ribbed at 6' to tightly engage the hub. Projecting from the inner end of sleeve 6 is the annular flange 7. Encircling sleeve 6 is the annular brake-sleeve 8, having its outer surface smooth or continuous, as shown. Sleeve 6 may be formed with ribs 9, which fit corresponding depressions in the inner surface of sleeve 8, whereby rotation of the latter on sleeve 6 is rendered impossible. In the present embodiment of the invention the sleeves and hub thus assembled comprise the rotating element of the brake mechanism.

Sleeve 8 is formed, preferably, of a material which may be effectually gripped by the brake-band without unnecessarily wearing either the sleeve or band. Rubber or paper composition may be advantageously used or the sleeve may be formed of wood. The sleeve may be readily removed and replaced whenever necessary.

An annular casing 10 is secured to axle 2 and projects outward therefrom into close proximity to flange 7 and completely incloses the inner portion of the hub, including brake-sleeve 8, thus excluding dust and dirt from the brake mechanism and from the inner portion of the wheel-journal.

Encircling sleeve 8 with one or more wraps is the flexible metallic brake-band 11, the ends 11' of which project outward through slots 10' in casing 10 and are clamped in the split extremities 12' of brake bar or beam 12. This bar is slidably supported in the slotted arms or lugs 13, which are preferably formed integral with and project from the opposite casings 10. As the brake is usually applied to the rear wheels, operating-rod 14 is extended frontward from bar 12 and may be manipulated by any desired or well-known form of lever mechanism (not shown) within reach of the driver.

As the brake-band 11 is preferably formed of spring-steel, it will by its own elasticity loosen its grip on sleeve 8 when bar 12 is relaxed. The band may, however, be formed of different material and need not necessarily be of flat section.

While the invention is designed primarily as a brake for vehicle-wheels, it may be applied to other rotatable bodies requiring a brake. The construction and operation of the improved mechanism is such that it may be readily mounted on vehicles of various types regardless of the form of running-gear and spring construction thereof.

I claim—

1. The combination of a rotating body provided with a brake-drum, a casing within which the drum rotates, a brake-band extending around the drum, means for operating the band, and a part rotatable with the body and lying close to the casing for the purpose of closing the same.

2. The combination of a rotating body provided with a brake-drum and with a part at the inner end of and projecting beyond the drum, a casing extending around the drum with its open side in close proximity to said extending part, thereby closing the casing, a brake-band extending around the drum within the casing, and means for operating the band.

3. The combination of a vehicle wheel-hub, a metallic sleeve secured to the inner end thereof, the inner end of the sleeve having a continuous outwardly-extending flange, a brake-sleeve removably secured to the metallic sleeve, a fixed casing extending over the brake-sleeve and reaching to the said continuous flange, a brake-band extending around the brake-sleeve, and means for operating the band.

4. The combination of a vehicle-axle, a wheel-hub, a casing carried by the axle and enveloping the inner portion of the hub, a brake-band extending around the hub within the casing and outward through the latter, and band-actuating means at the exterior of the casing.

5. The combination of a vehicle-axle, a wheel-hub, a casing carried by the axle and enveloping the inner portion of the hub, a brake-band extending through the casing and around the hub, a guide projecting from the casing, and a band-actuating device movable in the guide.

6. The combination of a vehicle-axle, wheel-hubs at opposite ends thereof, casings carried by the axle for inclosing the inner ends of the hubs, brake-bands for the hubs extending around the latter and through the casings, supports or guides projected from the casings, and an operating-bar movable in said supports and to which the brake-bands are secured.

7. The combination of a vehicle-axle, a wheel-hub, a metallic sleeve secured to the hub, a continuous flange projecting laterally from the inner end of the sleeve, a brake-sleeve secured to the metallic sleeve, a casing projecting from the axle over the brake-sleeve and in close proximity to said flange, a brake-band extending around the brake-sleeve and outwardly through the casing, and band-actuating means.

In testimony whereof I affix my signature in presence of two witnesses.

GEORGE REISDORF.

Witnesses:
J. M. NESBIT,
MARGARET HUGHES.